(12) United States Patent
Heidari et al.

(10) Patent No.: US 11,418,976 B2
(45) Date of Patent: Aug. 16, 2022

(54) WIRELESS ADAPTATION BASED ON MULTIDIMENSIONAL INPUT

(71) Applicant: SEMICONDUCTOR COMPONENTS INDUSTRIES, LLC, Phoenix, AZ (US)

(72) Inventors: Sam Heidari, Los Altos Hills, CA (US); Kamlesh Rath, Pleasanton, CA (US); Raghuram Rangarajan, Fremont, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 72 days.

(21) Appl. No.: 16/856,351

(22) Filed: Apr. 23, 2020

(65) Prior Publication Data

US 2020/0404512 A1 Dec. 24, 2020

Related U.S. Application Data

(60) Provisional application No. 62/863,191, filed on Jun. 18, 2019.

(51) Int. Cl.
*H04W 24/02* (2009.01)
*H04W 24/08* (2009.01)
*H04W 84/12* (2009.01)
*H04L 41/0816* (2022.01)
*H04L 43/0817* (2022.01)
(Continued)

(52) U.S. Cl.
CPC ......... *H04W 24/02* (2013.01); *H04L 41/0816* (2013.01); *H04L 41/5019* (2013.01); *H04W 24/08* (2013.01); *H04L 43/087* (2013.01); *H04L 43/0817* (2013.01); *H04L 43/0852* (2013.01); *H04W 84/12* (2013.01)

(58) Field of Classification Search
None
See application file for complete search history.

(56) References Cited

U.S. PATENT DOCUMENTS 6,973,037 B1 * 12/2005 Kahveci ............ H04Q 11/0464
370/236
8,755,455 B2 6/2014 Heidari et al.
(Continued)

OTHER PUBLICATIONS

G. Yang et al., Narrowband time delay estimation based on correlation coefficient, Journal of Systems Engineering and Electronics, vol. 20, No. 5, 2009, pp. 937-941.
(Continued)

*Primary Examiner* — Faruk Hamza
*Assistant Examiner* — Cassandra L Decker
(74) *Attorney, Agent, or Firm* — Maschoff Brennan

(57) ABSTRACT

A method may include obtaining multiple first parameters associated with a wireless network. The first parameters include one or more environment-specific parameters and one or more packet-specific parameters. The method may include generating a metric from a combination of the first parameters. The method may include, in response to determining to adjust the performance of the wireless network based on the metric, determining one or more operating parameters to adjust. The method may include adjusting the performance of the wireless network by adjusting the one or more operating parameters.

20 Claims, 7 Drawing Sheets

(51) Int. Cl.
*H04L 43/0852* (2022.01)
*H04L 43/087* (2022.01)
*H04L 41/5019* (2022.01)

(56) References Cited

U.S. PATENT DOCUMENTS

| | | | | |
|---|---|---|---|---|
| 9,717,014 | B1 | 7/2017 | Amiri et al. | |
| 9,788,263 | B1 | 10/2017 | Amiri et al. | |
| 2012/0307934 | A1* | 12/2012 | Heidari | H04L 1/0003 |
| | | | | 375/295 |
| 2014/0328356 | A1* | 11/2014 | Cachin | H04J 3/065 |
| | | | | 370/509 |
| 2015/0257081 | A1* | 9/2015 | Ramanujan | H04L 45/125 |
| | | | | 370/329 |
| 2015/0350933 | A1* | 12/2015 | Mannemala | H04W 76/18 |
| | | | | 370/225 |
| 2017/0006483 | A1* | 1/2017 | Attanasio | H04L 67/125 |
| 2018/0213412 | A1* | 7/2018 | Makati | H04W 16/26 |
| 2018/0242169 | A1* | 8/2018 | Kowal | H04W 28/0247 |
| 2020/0245406 | A1* | 7/2020 | Zhu | H04W 48/18 |
| 2020/0322281 | A1* | 10/2020 | Thubert | H04L 47/562 |

OTHER PUBLICATIONS

Channel Correlation, https://www.sciencedirect.com/topics/engineering/channel-correlation, Mimo Wireless Networks (Second Edition), 2013 (accessed on Mar. 16, 2022), 24 pgs.

Wikipedia entry for Cross-correlation as of Mar. 18, 2019 (accessed on Mar. 16, 2022), 7 pgs.

Wikipedia entry for Correlation coefficient as of May 23, 2019 (accessed on Mar. 16, 2022) 3 pgs.

\* cited by examiner

WIRELESS ADAPTATION BASED ON MULTIDIMENSIONAL INPUT

CROSS-REFERENCE TO RELATED APPLICATION

This patent application claims the benefit of and priority to U.S. Provisional App. No. 62/863,191 filed Jun. 18, 2019 titled "RATE ADAPTION," which is incorporated in the present disclosure by reference in its entirety.

FIELD

The implementations discussed herein relate to wireless adaptation based on multidimensional input.

BACKGROUND

Unless otherwise indicated in the present disclosure, the materials described in the present disclosure are not prior art to the claims in the present application and are not admitted to be prior art by inclusion in this section.

A typical wireless network usually includes at least one access point (AP) through which stations can connect to a wireless network. A common wireless network is a Wi-Fi network, which is a non-technical description that is generally correlated with the IEEE 802.11 standards, as well as Wi-Fi Protected Access (WPA) and WPA2 security standards, and the Extensible Authentication Protocol (EAP) standard. (Wi-Fi certification currently requires conformance with these standards.) A wireless network can include a wireless local area network (WLAN) or a network of some other size.

In a typical implementation, stations are connected to a device with a dedicated application such as data, video, or voice. A Quality of Service (QoS) module identifies and characterizes the packets based upon their importance and application constraints. A rate selection module determines the correct modulation and coding scheme (MCS) for each packet across multiple stations based on channel quality. The MCS as defined per WiFi standards determines constellation size and coding rates. Number of retries may be used when errors are encountered in packet retransmissions.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

Methods and systems may include obtaining multiple parameters associated with a wireless network. The parameters include one or more environment-specific parameters and one or more packet-specific parameters. The method may include generating a metric from a combination of the parameters. The method may include, in response to determining to adjust the performance of the wireless network based on the metric, determining one or more operating parameters to adjust. The method may include adjusting the performance of the wireless network by adjusting the one or more operating parameters.

BRIEF DESCRIPTION OF THE DRAWINGS

Example implementations will be described and explained with additional specificity and detail through the use of the accompanying drawings in which.

DETAILED DESCRIPTION

Figure 1:
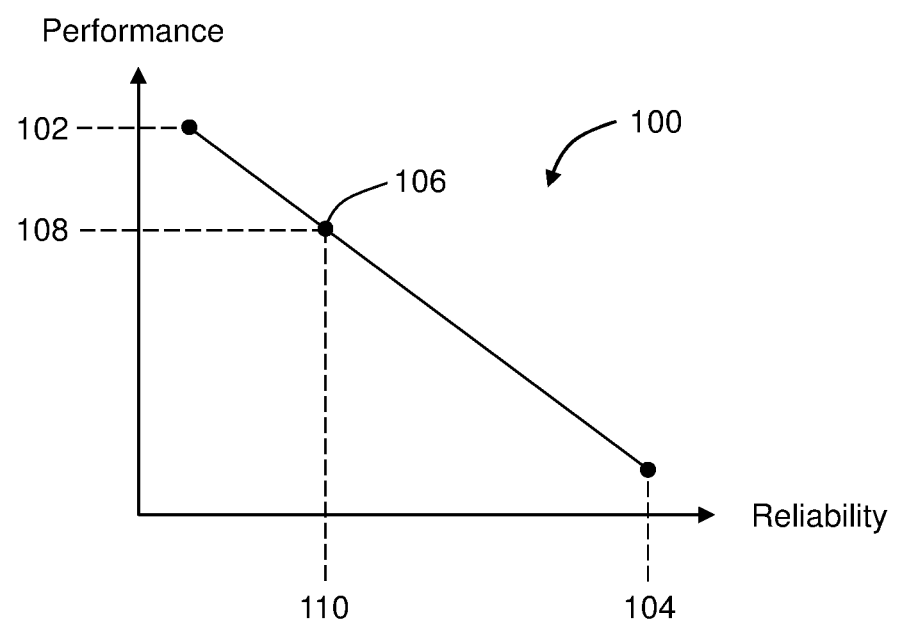
FIG. 1 illustrates a performance curve showing an example relationship between performance and reliability in a wireless network.

FIG. 1 illustrates a performance curve 100 showing an example relationship between performance (e.g., throughput) and reliability (e.g., latency, packet error rate) in a wireless network. As illustrated in FIG. 1, peak performance 102 may generally be realized at the expense of low reliability, e.g., high latency or high packet error rate (PER). Conversely, peak reliability 104 (e.g., low latency or low PER) may generally be realized at the expense of low performance, e.g., low throughput.

Points on the performance curve 100 between the two extremes 102, 104 have intermediate performance and reliability. For example, a point 106 on the performance curve 100 has a performance 108 that is less than the peak performance 102 and higher than the performance associated with the peak reliability 104. In addition, the point 106 has a reliability 110 that is less than the peak reliability 104 and greater than the reliability associated with the peak performance 102.

Implementations described herein adaptively adjust performance, such as latency, PER, throughput, packets per second (PPS), etc. of wireless networks to any point on the performance curve 100 based on multidimensional input. The performance may be adjusted at an AP, a STA, or other device in the wireless network. For simplicity, the AP is described as making the adjustment.

Multidimensional input may include input from one or more devices such as AP(s) and STAs, each at a different location, where the input includes multiple parameters measured or otherwise determined by the corresponding device at the corresponding location. Such parameters may include packet-specific parameters (e.g., transmit buffers), environment-specific parameters (e.g., interference), service constraints (e.g., maximum throughput of the wireless network), or user feedback (e.g., user change to video streaming quality).

A metric may be generated from the multidimensional input and/or may be a function of a given state of the wireless network. For example, a metric such as traffic demand-to-channel availability ratio in the wireless network, airtime utilization in the wireless network, or a combination thereof may be generated from the multidimensional input. Alternatively or additionally, implementations described herein may formulate a function through deep learning of the multidimensional inputs to generate the metric or a set of metrics.

The AP or other device in the wireless network may determine whether to adjust performance of the wireless network based on the metric or set of metrics. In response to a positive determination, the AP or other device may determine one or more operating parameters to adjust. The AP or other device may then adjust the performance of the wireless network by adjusting the one or more operating parameters. Generally, the performance may be adjusted by adjusting latency, PER, throughput, PPS, or the like. More specifically, adjusting the performance by adjusting the one or more operating parameters may include adjusting one or more of modulation and coding scheme (MCS), modulation rate, or other operating parameters as described herein.

Alternatively or additionally, the determination of whether and how to adjust performance of the wireless network may be made by two or more APs in the wireless network jointly, a central controller, some other device or system, or group of devices or systems. Such a determination may be made by pushing all the obtained parameters upward, e.g., to a central controller, where the determination may be made to achieve joint optimality across multiple APs and stations.

In an example, the AP obtains parameters associated with the wireless network, which parameters may include or be used to determine one or both of the traffic demand-to-channel availability ratio and airtime utilization in the wireless network. The AP generates a metric that includes the traffic demand-to-channel availability ratio, airtime utilization, a combination of the two, or some other metric. If the metric is less than a threshold, the AP may down shift one or more physical (PHY) layer operating parameters such as MCS, which may have the dual effect of decreasing performance/throughput and increasing reliability in the wireless network.

Accordingly, some implementations described herein may optimize performance of wireless networks to satisfy minimum performance constraints while improving reliability or vice versa. Such adjustability may better use available resources and improve user experience.

Figure 2:
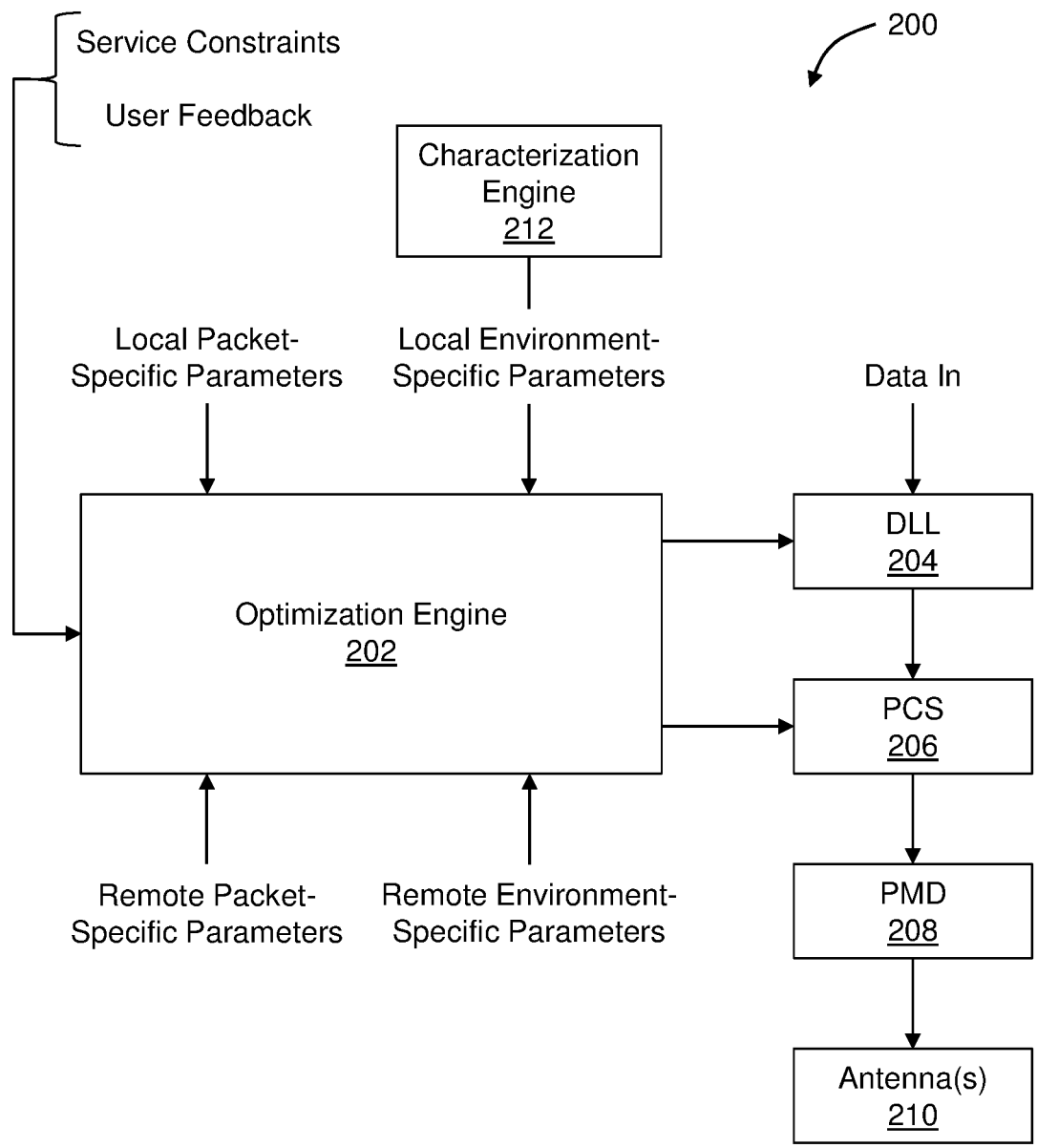
FIG. 2 depicts an example system with an optimization engine.

FIG. 2 depicts an example system 200 with an optimization engine 202. The system 200 includes the optimization engine 202, a Data Link Layer (DLL) 204, a Physical Coding Sublayer (PCS) 206, a Physical Medium-Dependent Sublayer (PMD) 208, and antenna(s) 210. The PCS 206 and the PMD 208 may be considered part of the PHY layer. The components of FIG. 2 may be implemented on a station, such as an AP to a wireless local area network (WLAN) or other wireless network.

A station, as used herein, may refer to a device with a media access control (MAC) address and a PHY interface to a wireless medium that complies with the Institute of Electrical and Electronics Engineers (IEEE) 802.11 standards or other wireless standards, such as Global System for Mobile Communications (GSM), Interim Standard 95 (IS-95), Universal Mobile Telecommunications System (UMTS), CDMA2000, Long-Term Evolution (LTE), 5G, or other cellular communication standard or protocol. The IEEE 802.11 standards are contention-based standards for handling communications among multiple competing devices for a shared wireless communication medium on a selected one of multiple communication channels. The frequency range of each communication channel is specified in the corresponding one of the IEEE 802.11 protocols being implemented, e.g. "a", "b", "g", "n", "ac", "ad", "ax".

Devices that comply with the IEEE 802.11 standards include Wi-Fi-compliant devices since Wi-Fi is generally considered a superset of the 802.11 standards. Alternatively, a station may comply with a different standard than IEEE 802.11, or no standard at all, may be referred to as something other than a "station," and may have different interfaces to a wireless or other medium.

A station that has multiple antennas may be capable of multiple-input and multiple-output (MIMO) communication. Multiple-input and single-output (MISO), single-input and multiple-output (SIMO), and single-input and single-output (SISO) are special cases of MIMO. MISO may be implemented when the receiver has a single antenna. SIMO may be implemented when the transmitter has a single antenna. SISO may be implemented when neither the transmitter nor the receiver have multiple antennae. Techniques described herein may be applicable to any of these special cases, depending upon whether the techniques can be used with one transmitter (Tx) antenna and/or one receiver (Rx) antenna. Thus, the acronym MIMO could be considered to include the special cases, if applicable. The techniques may also be applicable to multiuser (MU)-MIMO (MU-MIMO), cooperative MIMO (CO-MIMO), MIMO routing, orthogonal frequency division multiplexing (OFDM)-MIMO, or other MIMO technologies.

Some techniques described herein may implement coding. As used herein, coding may include adding systematically generated redundant data or error-correcting code to a modulated signal. Coding enables a decoder at a receiver to detect and perhaps correct bit errors. The PER is the probability that one or more bits in a block of coded bits is decoded in error. PER is different from bit error rate (BER), but the term PER is treated herein as a more general term that could be read as BER depending upon the context. The amount of error reduction provided by a given code is typically characterized by its coding gain in Additive White Gaussian Noise (AWGN) and its diversity gain in fading. As used herein, coding gain in AWGN is defined as the amount Signal-to-Noise power Ratio (SNR) can be reduced under the coding technique for a given PER. An MCS uses a joint design of code and modulation to obtain coding gain without bandwidth expansion. Good performance in fading can be optimized by combining AWGN channel codes with interleaving and by designing the code to optimize its inherent diversity.

The term "layer" herein is used in accordance with standard industry use. The Open Systems Interconnection (OSI) model is a way of sub-dividing a communications system into smaller parts called layers. A layer is a collection of conceptually similar functions that provide services to the layer above it and receives services from the layer below it. On each layer, an instance provides services to the instances at the layer above and requests service from the layer below. Although other models (e.g., TCP/IP model) define different layers, it is not difficult for those with skill in computer science to compare other models with the OSI model.

Layer One of the OSI Model, the Physical Layer, defines the electrical and physical specifications for devices. In particular, it defines the relationship between a device and a transmission medium, such as a copper or optical cable. This includes the layout of pins, voltages, cable specifications, hubs, repeaters, network adapters, host bus adapters (HBA) used in storage area networks, and more. Various Physical Layer Ethernet standards are in the Physical Layer; Ethernet incorporates both this layer and the DLL. The same applies to other local-area networks, such as token ring, FDDI, ITU-T G.hn, and IEEE 802.11, as well as personal area networks such as Bluetooth and IEEE 802.15.4. It is not uncommon to refer to the Physical Layer as PHY, particularly in the context of 802.11a/b/g/n PHY or ITU-T G.hn PHY. However, in this paper "PHY" is intended to include any applicable Physical Layer or applicable portion thereof, and the term PHY is used henceforth.

The major functions and services performed by the PHY are: Establishment and termination of a connection to a communications medium; participation in the process whereby the communication resources are effectively shared among multiple users; modulation, or conversion between the representation of digital data in user equipment and the corresponding signals transmitted over a communications channel.

Layer Two of the OSI model, the DLL provides the functional and procedural means to transfer data between network entities and to detect and possibly correct errors that may occur in the PHY; the DLL manages the interaction of devices with a shared medium. (The DLL is part of or corresponds to the Link Layer of the TCP/IP reference model.) Both WAN and LAN services arrange bits from the PHY into logical sequences called frames. Not all PHY bits necessarily go into frames, as some of these bits are purely intended for PHY functions.

The IEEE 802.11 protocol defines MAC and Logical Link Control (LLC) sublayers of the DLL. The MAC sublayer detects but does not correct errors. Above the MAC sublayer is the media-independent IEEE 802.2 LLC sublayer, which deals with addressing and multiplexing on multi-access media.

In the example of FIG. 1, the optimization engine 202 may enable the system 200 to optimize a stream based upon considerations from multiple operational layers. In contrast, QoS mechanisms queue packets based upon the grade of QoS, but do not modify the PHY parameters as a function of the packet type. So the optimization of QoS results in guaranteed service for certain grades of packet traffic based on packet characteristics (specifically, the QoS grade of the packet), but optimization based upon channel characteristics has nothing to do with the QoS of the packet since all queued packets, once they are queued, use the same MCS. The optimization engine 202 can adjust one or more of various operating parameters to adjust performance toward a desired performance level based on packet-specific parameters, environment-specific parameters, service constraints, or user feedback. The operating parameters may include MCS, transmission start times, medium reservation, transmission redundancy, aggregation size of aggregate-MAC service data units (A-MSDUs) and aggregate-MAC protocol data units (A-MPDUs), fragmentation; request to send (RTS)/clear to send (CTS) flow control, modulation rate, Nss of a beamforming matrix, orthogonal frequency divisional multiple access (OFDMA), downlink (DL) OFDMA resource unit (RU) allocations, uplink (UL) OFDMA assignments, MU-MIMO, MU-MIMO parameters (e.g., packet wait time to fill traffic, MU-MIMO group formation, MU-MIMO rate), guard interval duration, retry rates for retransmissions, or other suitable operating parameters.

The optimization engine 202 may obtain local parameters, such as packet-specific parameters and environment-specific parameters measured or otherwise determined locally at the system 200 itself. Alternatively or additionally, the optimization engine 202 may obtain remote parameters, such as packet-specific parameters and environment-specific parameters measured or otherwise determined remotely from the system 200. The remote parameters may be measured or determined at other stations in the same wireless network as the system 200 and then sent from the other stations to the system 200.

The environment-specific parameters are generally related to channel conditions on a particular channel, and may generally be used to characterize a channel as "good" or "bad." The environment-specific parameters may include channel-specific parameters, channel availability, interference, channel capacity, or other channel conditions.

The local packet-specific parameters may be determined by monitoring a transmit buffer of the system 200 to determine burstiness of the traffic at the system 200. The remote packet-specific parameters may be obtained from another station that determines such packet-specific parameters in the same or different manner. The packet-specific parameters may include length, jitter, latency, packet type (e.g., voice, video, audio, web), frame type (e.g., I-frame, P-frame, B-frame), user type (e.g., a type of a user that is an intended recipient of a data packet), application type (e.g., a type of an application that requested the data), or other packet-specific parameters.

In some implementations, the optimization engine 202 may also obtain service constraints or user feedback. The optimization engine 202 may obtain the service constraints or user feedback through measurements at the upper layer or as a user-defined input to the system. For example, when a wireless network is configured, an administrator or other user may assign some QoS constraints on which packets should access the medium. The user may provide feedback through BSR and how many packets are getting served in each QoS level. Further, there may be some application layer visibility that may indicate to the AP that certain bandwidth requirements are not being met by the system on which the AP may act upon.

Service constraints may include PER constraints, delay constraints, constraints associated with the type of frame, robustness constraints, beamforming constraints (which can include whether beamforming should be used and/or an implicit/explicit beamforming requirement), aggregation constraints, fragmentation constraints, maximum throughput of the wireless network, best-effort delivery constraints, streaming video traffic delivery constraints, streaming audio traffic delivery constraints, voice traffic delivery constraints, parental constraints, a maximum number of streaming video channels (or other channels) permitted by an Internet Service Provider (ISP) communicatively coupled to the wireless network, maximum download speed permitted by the ISP, maximum upload speed permitted by the ISP, or other suitable constraints.

The user feedback may include feedback from a user that is effective to alter performance or an operating parameter of the wireless network. For example, suppose the user is streaming high definition (HD) quality video through the system 200 to a station of the user and the video is repeatedly interrupted to buffer. In such a scenario, the user may manually reduce the streaming quality to standard definition (SD) quality video to reduce buffering. The user's selection of SD quality video when the user was previously streaming HD quality video is an example of user feedback effective to alter performance or an operating parameter of the wireless network.

When it is determined to adjust performance of the wireless network based on the metric generated from a combination of the parameters obtained by the optimization engine 202, e.g., by adjusting one or more operating parameters, the one or more operating parameters may be adjusted at the appropriate Layer of the system 200. For example, aggregation and fragmentation operating parameters (such as A-MSDU/A-MPDU size) may be adjusted at the DLL 204. The reason aggregation and fragmentation operating parameters are applied at the DLL 204 is that it is a packet-level optimization technique. That is, aggregation and fragmentation operating parameters apply to Layer 2 packets. Other operating parameters may be adjusted at, e.g., the DLL 204, the PCS 206, or the PMD 208, as appropriate.

In the example of FIG. 2, the DLL 204 receives data (indicated as "Data In" in FIG. 1). As described above, the DLL 204 may adjust operating parameters as instructed by the optimization engine 202 to adjust performance of the wireless network, e.g., along the performance curve 100 of FIG. 1.

The PCS 206 may perform autonegotiation and coding, such as 8b/10b encoding. Typically, the objective of coding at the PHY is achieving zero PER. This enables a system to maximize throughput. However, it may not be "optimal" to simply maximize throughput. The PCS 206 may be implemented as one or more of a Forward Error Correction (FEC) encoder, bit interleaver, constellation mapper, or precoding engine, or with some other combination of components. (One or more of these components could also or instead be considered part of the PMD 208.) With whatever components are used, the PCS 206 processes digital data such that an analog waveform having certain characteristics may eventually be produced to adjust the performance of the wireless network, e.g., along the performance curve 100 of FIG. 1, as appropriate in view of the metric generated from the parameters obtained by the optimization engine 202.

In the example of FIG. 2, the PCS 206 is operationally connected to the PMD 208. The PMD 208 may include a digital-to-analog converter (DAC) and RF chains. Digital data from the PCS 206 is converted to analog waveforms at the DAC and upconverted to a desired carrier frequency by the RF chains. The analog waveforms are provided through the RF chains to the antenna(s) 210 for transmission. The number of RF chains will typically correspond to the number of antenna(s) 210. The RF chains can be part of a circuit that includes a controller capable of tuning to a desired carrier frequency.

In the example of FIG. 2, the PMD 208 is operationally connected to the antenna(s) 210 or an antenna array. Generally as used in this paper, an "antenna array" includes multiple antennas coupled to a common source or load to produce a directive radiation pattern. With an antenna array, the spatial relationship between the antennas can contribute to directivity. If there is only one antenna, certain functionality, such as MIMO, is not normally possible. Reference herein to a Tx antenna does not necessarily mean that the antenna is dedicated to transmission only; the same antenna can, depending upon the implementation, be used for both Tx and Rx. So a designation of an antenna as Tx or Rx could be considered a description of use at a point in time, unless context dictates otherwise.

Assuming the antenna(s) 210 include multiple antennas, the system 200 may be capable of precoding, spatial multiplexing, and/or diversity coding. Spatial multiplexing can be combined with precoding, e.g., when the channel is known at the transmitter or combined with diversity coding, e.g., when decoding reliability is in trade-off.

Precoding, as used herein, may be used in conjunction with multi-stream transmission in MIMO radio systems. In precoding, the multiple streams of the signals are mapped onto the transmit antennas with independent and appropriate weighting per each antenna such that some performance metric such as the link throughput is maximized at the receiver output. Some benefits of precoding include increasing signal gain on one or more streams through diversity combining, reducing delay spread on one or more streams, or other benefits.

Beamforming, as used herein, is a special case of precoding in which a signal is emitted from each of multiple transmit antennas with appropriate weighting such that some performance metric such as the signal power is maximized at the receiver. Some benefits of beamforming include increasing signal gain for specific streams by mapping the streams to specific modes of the channel.

A MIMO antenna configuration can be used for spatial multiplexing. In spatial multiplexing, a high rate signal is split into multiple lower rate streams, which are mapped onto the Tx antenna array. If these signals arrive at an Rx antenna array with sufficiently different spatial signatures, the receiver can separate the streams, creating parallel channels. Spatial multiplexing can be used to increase channel capacity. The maximum number of spatial streams may be limited by the lesser of the number of antennas at the transmitter and the number of antennas at the receiver. Spatial multiplexing can be used with or without transmit channel knowledge.

A data stream transmitted via the antenna array 210 can be received by a receiver (not shown) and converted to digital data, such that the Data In at the system 200 operating as a transmitter is reproduced at the receiver as Data Out.

The system 200 may further include a characterization engine 212 to generate local environment-specific parameters used by the optimization engine 202. The receiver may provide processed or unprocessed feedback regarding, e.g., channel conditions, as remote environment-specific parameters to the optimization engine 202. Alternatively or additionally, the receiver may provide remote packet-specific parameters to the optimization engine 202.

The system 200 of FIG. 2 is described as operating as a transmitter. Alternatively or additionally, the system 200 may operate as a receiver, which would perform steps similar to those described above for a transmitter in reverse order. Stations such as the system 200 are typically capable of both transmitting and receiving and may therefore be referred to as transceivers. Examples of transmitter and receiver components that could be implemented in the system 200 are illustrated below with respective reference to FIGS. 4 and 5.

Figure 3A:
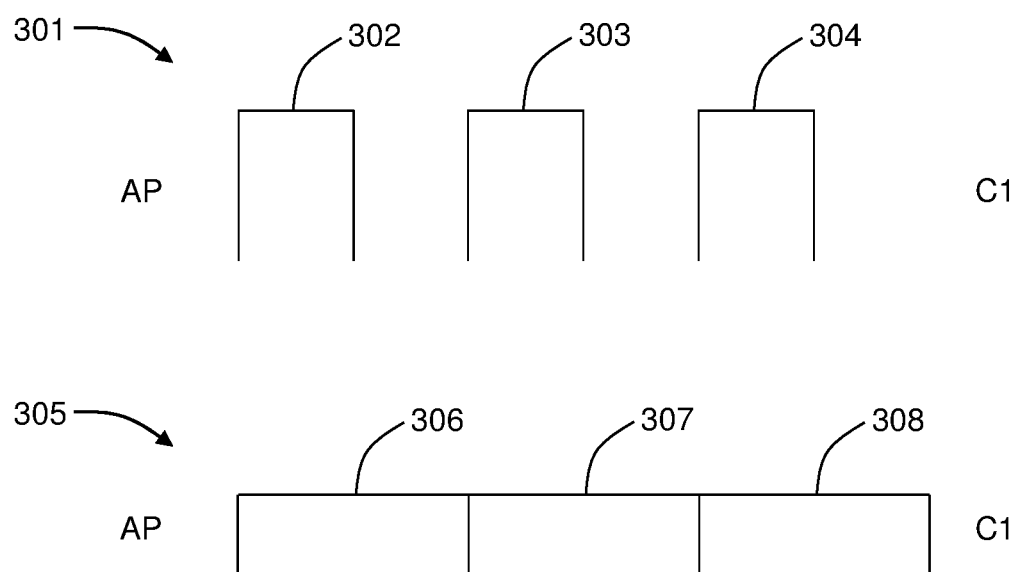
FIGS. 3A-3C illustrate various examples of adaptive adjustment of performance of a wireless network that includes an AP and one or more client devices.
Figure 3B:
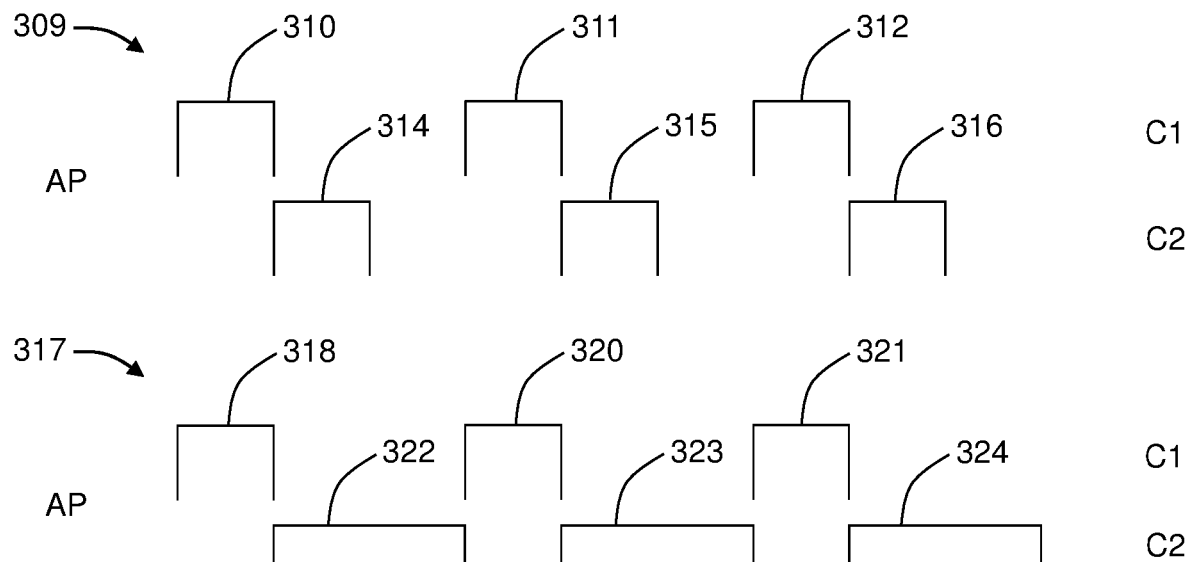
Figure 3C:
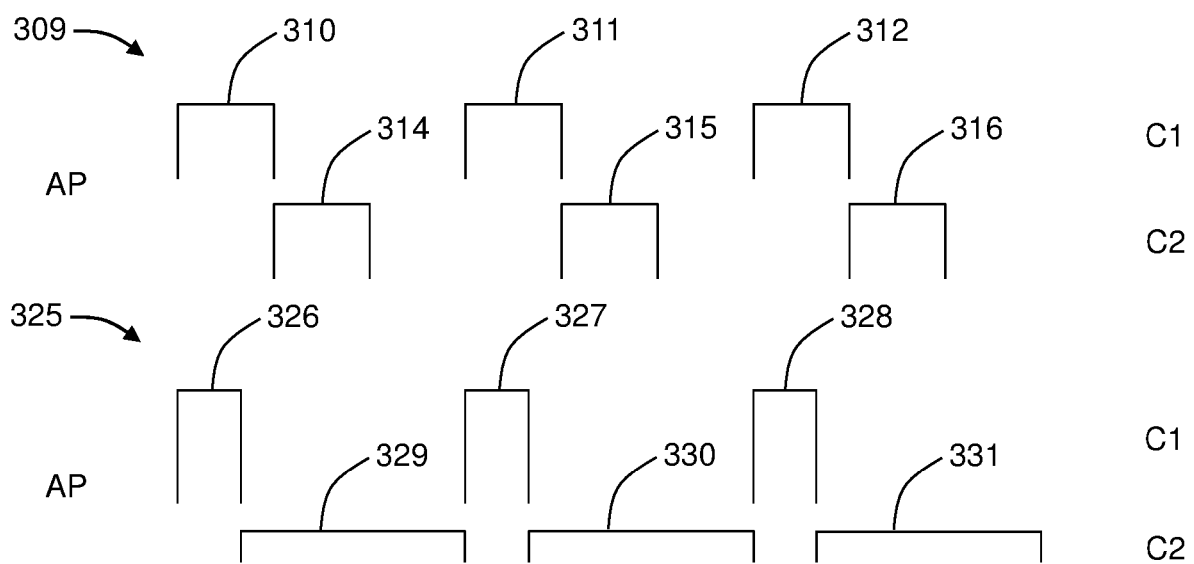

FIGS. 3A-3C illustrate various examples of adaptive adjustment of performance of a wireless network that includes an AP and one or more client devices C1 and C2. The AP or the client devices may include or correspond to the system 200 of FIG. 2. In the example of FIG. 3A, and as illustrated at 301, the AP transmits data packets 302-304 to the client device C1. With combined reference to FIGS. 1 and 3A, the data packets 302-304 may be transmitted with a relatively high MCS or modulation rate, e.g., to achieve performance at or as close as possible to the peak performance 102 of FIG. 1.

In the example of FIG. 3A, after obtaining parameters associated with the wireless network, e.g., to obtain or generate the traffic demand-to-channel availability ratio, the airtime utilization, or a metric based on a combination thereof, it may be determined that the performance of the wireless network may be pushed away from the peak performance 102 toward the peak reliability 104. For example, the point 106 on the performance curve may have suitably high performance 108, albeit less than the peak performance 102, in view of any system constraints, while offering reliability 110 that is better than the reliability at the peak performance 102. Accordingly, and as illustrated at 305, the MCS or modulation rate of packets 306-308 sent to the client device C1 may be reduced compared to the MCS or modulation rate associated with the packets 302-304 such that the AP sends the client device C1 packets 306-308 with a lower MCS or modulation rate that have higher reliability than the packets 302-304. The amount of reduction in the MCS or modulation rate of the packets 306-308 sent to the client device C1 (compared to the MCS or modulation rate of the packets 302-304) may be selected to improve reliability (e.g., by reducing PER) without being so much that available airtime is exceeded.

In the example of FIG. 3B, and as illustrated at 309, the AP transmits data packets 310-312 to the client device C1 and the AP transmits data packets 314-316 to the client device C2. With combined reference to FIGS. 1 and 3B, the data packets 310-316 may be transmitted with a relatively high MCS or modulation rate. In an example, the client device C1 may be associated with a first user that has a lower priority than a second user associated with the client device C2. Alternatively or additionally, a packet type, application type, or other parameter(s) associated with traffic intended for the client device C2 (such as the packets 314-316) may have higher priority than a packet type, application type, or other parameter(s) associated with traffic intended for the client device C1 (such as the packets 310-312).

Accordingly, in the example of FIG. 3B, after obtaining parameters associated with the wireless network, it may be determined that the performance of the wireless network may be maintained as is for communications between the AP and the client device C1, while being pushed toward greater reliability for communications between the AP and the client device C2. Accordingly, and as illustrated at 317, the MCS or modulation rate for packets 318-320 sent to the client device C1 may be maintained the same as for packets 310-312, while the MCS or modulation rate for packets 322-324 sent to the client device C2 may be reduced compared to the MCS or modulation rate associated with the packets 314-316 such that the AP sends the client device C2 packets 322-324 with a lower MCS or modulation rate that have higher reliability than the packets 314-316.

The example of FIG. 3C assumes the same initial conditions as the example of FIG. 3B. In particular, as illustrated at 309 in FIG. 3C, the AP transmits the data packets 310-312 to the client device C1 and transmits the data packets 314-316 to the client device C2, each set of data packets being sent with the same MCS or modulation rate as illustrated at 309 in FIG. 3B. Further, the user type, the packet type, the application type, or other parameter(s) associated with traffic intended for the client device C2 (such as the packets 314-316) may have higher priority than the user type, the packet type, the application type, or other parameter(s) associated with traffic intended for the client device C1 (such as the packets 310-312).

Accordingly, in the example of FIG. 3C, after obtaining parameters associated with the wireless network, it may be determined that the performance of the wireless network may be pushed toward higher performance for communications between the AP and the client device C1, while being pushed toward greater reliability for communications between the AP and the client device C2. Accordingly, and as illustrated at 325, the MCS or modulation rate for packets 326-328 sent to the client device C1 may be increased compared to the MCS or modulation rate associated with the packets 310-312 such that the AP sends the client device C1 packets 326-328 with a higher MCS or modulation rate that have higher performance (e.g., throughput) than the packets 310-312. Analogously, the MCS or modulation rate for packets 329-331 sent to the client device C2 may be reduced compared to the MCS or modulation rate associated with the packets 314-316 such that the AP sends the client device C2 packets 329-331 with a lower MCS or modulation rate that have higher reliability than the packets 314-316. Moreover, in view of the increased performance of the packets 326-328 sent to the client device 31 in FIG. 3C, the MCS or modulation rate of the packets 329-331 sent to the client device C2 in FIG. 3C may be even lower than the MCS or modulation rate of the packets 322-324 sent to the client device C2 in FIG. 3B.

FIGS. 3A-3C illustrate various examples of adjustment of performance of a wireless network by adjusting an operating parameter (such as MCS or modulation rate) up or down depending on the desired direction of performance change. FIGS. 3A-3C also illustrate that an adjustment may be made network-wide or per traffic/user/application type. In such implementations, each traffic type, user type, or application type may have its own performance curve, such as the performance curve 100 of FIG. 1, which when summed together provide the performance curve for the wireless network as a whole. Each traffic type, user type, or application type may be adjusted to a different point on its corresponding performance curve.

In the discussion of FIGS. 3A-3C, the operating parameter that is adjusted is MCS or modulation rate. In other implementations, the same or other operating parameter(s) may be adjusted to adjust the performance. Various example operating parameters that may be adjusted to adjust performance will now be described.

RTS/CTS flow control may be enabled to improve reliability or disabled to improve performance.

When beamforming is implemented, the beamforming matrix is typically of size Nss-by-Nant, where Nss denotes the number of spatial streams to be transmitted and Nant denotes the total number of antennas. The elements of the beamforming matrix are typically computed, e.g., by the system 200 of FIG. 2, based on feedback that is received from the other station(s) that the system 200 communicates with. The feedback frames are referred to as Compressed Beamforming (CBF) frames. Such feedback frames may be used, alone or together with per-tone SNR, as input to the optimization engine 202 and may be used to generate the matrix that determines whether to adjust the performance and/or may be used to inform adjustments to one or more operating parameters such as Nss or modulation rate to improve or decrease reliability, as desired.

OFDMA is a multi-user version of OFDM. Multiple access is achieved in OFDMA by assigning subsets of subcarriers to individual users, which may allow simultaneous low-data-rate transmission from several users. OFDMA may be enabled to reduce latency which may in turn improve reliability, or OFDMA may be disabled to improve performance. The use of OFDMA may be triggered, e.g., by wireless state recognition such as small packets, crowded denser environments, or other criteria determined from the parameters obtained by the optimization engine 202.

A number of DL OFDMA RUs in a given allocation may be adjusted up or down to improve reliability or performance, as desired. The adjustment of the number of DL OFDMA RUs may serve as a way to trade frequency diversity, power spectral density, and MCS selection. Within OFDMA, a number of users, RUs to be used, and MCS within each of those RUs are examples of operating parameters that may be adjusted (e.g., turned on or off or increased or decreased) to adjust performance of the wireless network.

Thus, determining the operating parameters to adjust in this and other implementations may involve a multidimensional determination or solution to be solved together.

In the IEEE 802.11ax protocol, UL OFDMA is a feature designed to improve WLAN efficiency. A station such as an AP may schedule, through a downlink trigger frame, multiple client stations to send uplink frames simultaneously on different RUs. A RU may include one or more OFDMA subcarriers. To realize the full potential of the performance gain associated with UL OFDMA, the AP may determine the channel quality for each client station to make better RU assignments. UL OFDMA assignments for single or multiple users may be used, may be turned on or off, or may otherwise be adjusted to have a desired effect on reliability and performance. As an example, the AP may request block acknowledgments (BACKS) from multiple stations, each of which may respond back in UL OFDMA format resulting in efficient transmission and improved performance. Transmission may be more efficient where the BACKS result in the stations sending back their acknowledgments to the AP at essentially the same time. The system 200 may use parameters obtained from receive stations it communicates with, which parameters may include error vector magnitude (EVM) per-tone, to control uplink rates on the system 200.

Aggregation size, such as the size of A-MSDUs or A-MPDUs, may be adjusted up or down to adjust performance of the wireless network MU-MIMO may be enabled to improve reliability or disabled to improve performance. Alternatively or additionally, various operating parameters associated with MU-MIMO may be adjusted when MU-MIMO is enabled to adjust performance. For example, MU-MIMO rate may be adjusted to adjust performance, e.g., MU-MIMO rates may be selected to be conservative and reliable to improve reliability. As another example, a duration of packet wait time out for stations in a MU-MIMO group to fill traffic for MU-MIMO transmission may be adjusted to adjust performance. As another example, MU-MIMO group formation (e.g., size or composition of MU-MIMO groups) may be adjusted, e.g., to minimize or at least decrease latency rather than maximizing performance.

A duration of a guard band or guard interval may be adjusted to adjust performance. For example, increasing the guard interval may improve reliability and decrease performance, while decreasing the guard interval may improve performance and decrease reliability. In some implementations, the IEEE 802.11ax protocol is implemented, which may provide different guard interval modes to be more or less conservative for greater or lesser reliability.

Retry rates for packet retransmissions may be adjusted to adjust performance. For example, more conservative retry rates may be used to improve reliability, e.g., by increasing a likelihood of successful retransmission when packets are missed the first time due to collisions. Alternatively, less conservative retry rates may be used to improve performance.

Implementations described herein may involve or allow the AP to monitor the incoming traffic queues to predict the instantaneous and steady state traffic patterns in the wireless network. Alternatively or additionally, some implementations may understand—with peak performance achieved potentially via one or more of single user (SU), OFDMA, and MU—air time utilization of the wireless network. In this and other implementations, over a known epoch or duration of time, traffic queues may be monitored to determine an amount of traffic available to each node on the DL transmit side. Similarly, pending traffic on the UL side may be determined by querying STAs via buffer status report. If the rates are precisely known both on DL and UL side, a graph may be constructed of all paths to transmit these packets to flush out all the pending packets. In some implementations, each vertical layer of the graph may be a node and the connecting path to each other node may be SU, MU, or OFDMA. In theory, if there are N nodes with N1 OFDMA groups and N2 MU groups, there will be N paths for pure SU transmission and multiple permutations of N, N1, N2 paths. The search via all the paths to achieve the fastest way to transmit all the packets is the optimal solution. The solution will be NP complete. A brute force search may be possible since OFDMA and MU groups are limited and over a small period of time, only certain subset(s) of nodes will have pending traffic. The solution can be done via dynamic programming. Alternatively, a faster—but not necessarily fastest—way to transmit all the packets may be determined as a partially optimized solution. For example, the paths may be searched until a solution is identified that satisfies a particular threshold or condition without searching all paths.

The usage of techniques such as SU, OFDMA, and/or MU techniques may vary over time as performance of the wireless network is adjusted responsive to changes to the metric generated based on the parameters obtained by the optimization engine 202. Some implementations may accommodate for newer traffic patterns/conditions either in downlink or uplink to adjust traffic demand status continuously. Some implementations may calculate interference (both Wi-Fi and non-WiFi) in the wireless network as part of the metrics measured or obtained by the optimization engine 202. Alternatively or additionally, per node interference may be calculated and feedback may be provided to the system 200 that makes the decision of how to adjust the performance of the wireless network.

In some implementations, the metric generated based on the parameters obtained by the optimization engine 202 may be compared to one or more thresholds to determine when to adjust performance of the wireless network. In an example, two or more thresholds are provided to accommodate some hysteresis. For example, the system 200 may determine to adjust performance of the wireless network toward greater reliability in response to the metric moving from one side of (e.g., below) a first threshold to the other side (e.g., above). The system 200 may subsequently determine to adjust performance of the wireless network back toward greater performance in response to the metric moving from one side of (e.g., above) a second threshold to the other side (below) where the second threshold is spaced apart from (e.g., below) the first threshold. By building hysteresis into control of the performance, the system 200 may avoid unwanted and unnecessarily frequent switching of the performance of the wireless network. When a performance adjustment is reversed, it may be reversed in one shot or gradually.

Figure 4:
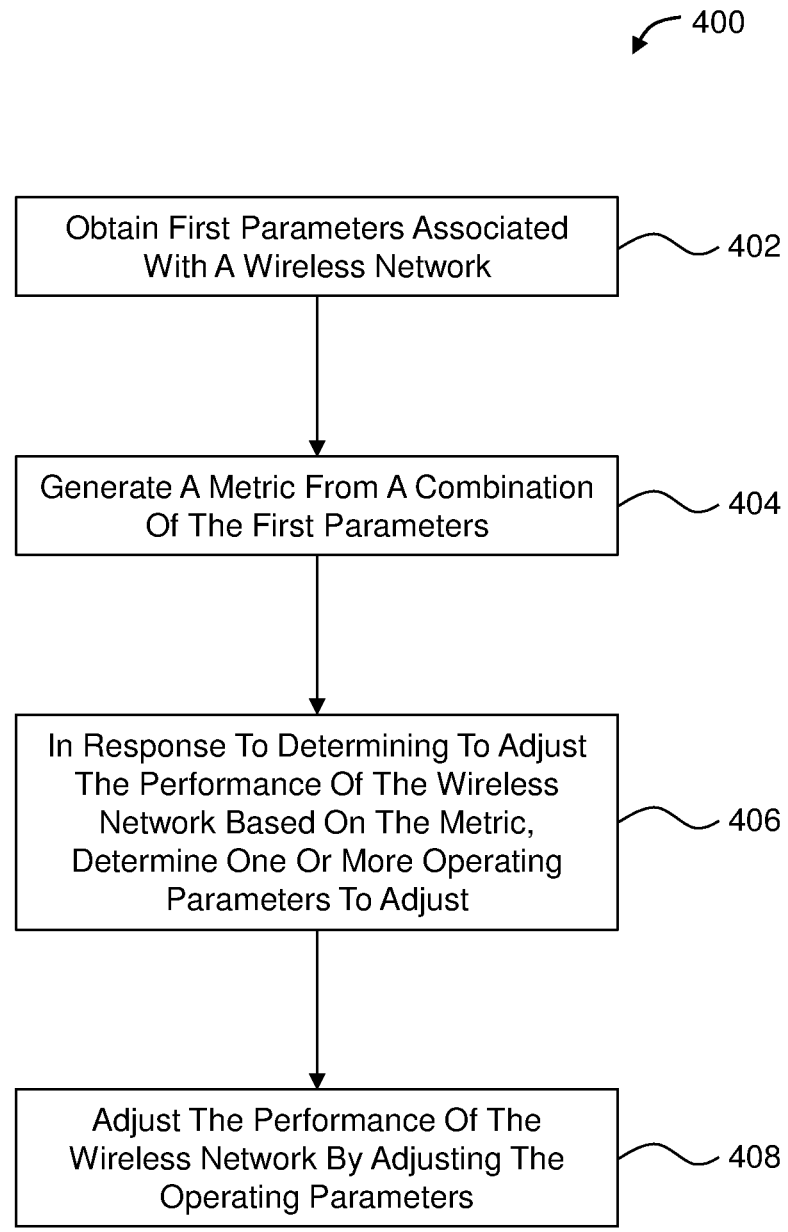
FIG. 4 illustrates a flowchart of an example method to adaptively adjust performance of a wireless network based on multidimensional input.

FIG. 4 illustrates a flowchart of an example method 400 to adaptively adjust performance of a wireless network based on multidimensional input. The method 400 may be performed by any suitable system, apparatus, or device. For example, the system 200 of FIG. 2 or other stations or devices described herein may perform or direct performance of one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may include a block 402, at which first parameters associated with a wireless network are obtained, e.g., by the optimization engine 202 of FIG. 2. The first parameters obtained at block 402 include multidimensional input. The first parameters may include one or more environment-specific parameters and one or more packet-specific parameters. The first parameters may be measured or otherwise obtained locally, e.g., at the system 200. Alternatively or additionally, the first parameters may be measured or otherwise obtained remotely, e.g., at one or more stations with which the system 200 communicates, and provided by the station(s) to the system 200.

The wireless medium in the wireless network to which the system 200 and the station belong is typically very directional. As a result, parameter measurements made by a sensor at a given location of the wireless network are most valid at the location of the sensor. Thus, parameter measurements at the system 200 operating as a transmitter are most valid at the system 200. However, parameter measurements at the station as a receiver (such as interference at the RX antenna(s) of the station) may be more accurate and/or more informative than parameter measurements at the system 200 when determining whether and how to adjust performance for traffic from the system 200 to the other station. Accordingly, the station may measure one or more first parameters, e.g., at the antenna(s) of the station, and send the first parameters to the system 200.

The remote first parameters from the station may be combined at the system 200 with the local first parameters of the system 200 to mitigate the effects of directionality in the determination of whether and how to adjust performance of the wireless network. Suppose sensor 1 of the system 200 measures a particular parameter at the location of the system 200, where sensor 1's measurement of the particular parameter is referred to as parameter $P_{1,1}$. Suppose sensor 2 of the station measures the particular parameter at the same time as sensor 1, but at the location of the station, where sensor 2's measurement of the particular parameter is $P_{2,1}$. Because the parameter $P_{2,1}$ is measured at the location of the station, it provides a more accurate measure of the particular parameter at the station and with respect to the station than the parameter $P_{1,1}$ measured at the system 200. However, due to the delay inherent in making the measurement of the parameter $P_{2,1}$ at the station and then coding and sending it to the system 200, it will represent an old or somewhat outdated measurement of the particular parameter by the time it reaches the system 200. In comparison, by the time the old measurement of the particular parameter arrives at the system 200 from the station, the system 200 may have a more recent measurement of the particular parameter from sensor 1. Accordingly, implementations described herein may correlate or weight parameters obtained by the optimization engine 202 from different locations. For example, if the local first parameters are generally inconsistent with the remote first parameters when accounting for the delay, the weight of the local first parameters may be adjusted down. As another example, if the local first parameters are generally consistent with the remote first parameters when accounting for the delay, the weight of the local first parameters may be adjusted up. The level of disagreement or agreement between the local first parameters and the delay-compensated remote first parameters may determine how much and in which direction the local first parameters are weighted.

Alternatively or additionally, the first parameters obtained at block 402 may include at least one of service constraints of the wireless network or user feedback. The service constraints of the wireless network may include at least one of: maximum throughput of the wireless network; best-effort delivery constraints; streaming video traffic delivery constraints; streaming audio traffic delivery constraints; voice traffic delivery constraints; parental constraints; a maximum number of streaming video channels permitted by an ISP communicatively coupled to the wireless network; maximum download speed permitted by the ISP; or maximum upload speed permitted by the ISP, or other service constraints. The user feedback may include feedback from a user that is effective to alter performance or an operating parameter of the wireless network. Block 402 may be followed by block 404.

At block 404, a metric may be generated from a combination of the first parameters obtained at block 402. In an example, generating the metric at block 404 may include generating the traffic demand-to-channel availability ratio based on the first parameters obtained at block 402. The traffic demand-to-channel availability ratio may consider all traffic buffers from a transmit perspective, all buffers required for UL transmission (e.g., from stations using buffer status report as part of the 802.1ax protocol in which each station generates current UL traffic demand for the next T milliseconds (ms). Alternatively or additionally, channel availability may be determined based on the RF environment and CCA registers to see how much airtime is available for the AP as well as getting stations reports (sensing from remote stations) to generate more accurate statistics and using these to obtain the ration. Generating the metric may alternatively or additionally include generating the airtime utilization metric based on the first parameters obtained at block 402. Generating the metric may include combining the traffic demand-to-channel availability ratio and the airtime utilization metric to form the metric. For example, the traffic demand-to-channel availability ratio and the airtime utilization metric may be summed together to form a single metric or may be combined in some other manner. Alternatively or additionally, deep learning may be applied to multidimensional inputs (e.g., the first parameters obtained at block 402) to formulate a function that generates the metric or a set of metrics. Block 404 may be followed by block 406.

At block 406, in response to determining to adjust the performance of the wireless network based on the metric, one or more operating parameters to adjust may be determined.

In some implementations, the method 400 may further include determining to adjust the performance of the wireless network based on the metric, e.g., before determining the one or more operating parameters to adjust. The performance of the wireless network may be determined to be adjusted based on the metric by at least one of: determining to adjust the performance of the wireless network as a whole; determining to adjust the performance per traffic type; determining to adjust the performance per user type; or determining to adjust the performance per application type.

In this and other implementations, determining to adjust the performance of the wireless network based on the metric may include comparing the metric to a threshold value; and one of the following. First, in response to the metric moving from above the threshold value to below the threshold value, the method 400 may include determining to at least one of: decrease latency, decrease PER, decrease throughput, or decrease PPS. Or second, in response to the metric moving from below the threshold value to above the threshold value, the method 400 may include determining to at least one of: increase latency, increase PER, increase throughput, or increase PPS. Block 406 may be followed by block 408.

At block 408, performance of the wireless network may be adjusted by adjusting the one or more operating parameters determined at block 406. Generally, adjusting the performance of the wireless network may include at least one of: adjusting latency; adjusting PER, adjusting throughput; or adjusting PPS. More specifically, adjusting the performance of the wireless network by adjusting the one or more operating parameters may include at least one of: adjusting a MCS; enabling or disabling RTS/CTS flow control; adjusting a modulation rate; adjusting Nss of a beamforming matrix; enabling or disabling OFDMA; adjusting a number of DL OFDMA RUs for an allocation; adjusting UL OFDMA assignments; adjusting aggregation size of at least one of A-MSDUs and A-MPDUs; enabling or disabling MU-MIMO; adjusting one or more MU-MIMO parameters selected from the following: a duration of packet wait time out for stations in MU-MIMO group to fill traffic for MU-MIMO transmission, MU-MIMO group formation, and MU-MIMO rate; adjusting a duration of a guard interval; or adjusting retry rates for packet retransmissions.

Modifications, additions, or omissions may be made to the method 400 without departing from the scope of the present disclosure. For example, the operations of method 400 may be implemented in differing order. Additionally or alternatively, two or more operations of the method 400 may be performed at the same time. Furthermore, the outlined operations and actions of the method 400 are only provided as examples, and some of the operations and actions may be optional, combined into fewer operations and actions, or expanded into additional operations and actions without detracting from the essence of the described implementations.

In addition, in some implementations, the method 400 may be performed repeatedly on a per packet basis, periodically, randomly, or according to some other schedule or timing. For example, the method 400 may further include adapting the performance of the wireless network on a per packet basis by repeatedly performing the following over time for each packet in the wireless network: obtaining current first parameters associated with the wireless network; generating a current metric from the combination of the current first parameters; in response to determining to adjust current performance of the wireless network based on the current metric, determining one or more current operating parameters to adjust; and adjusting the current performance by adjusting the one or more current operating parameters.

Figure 5:
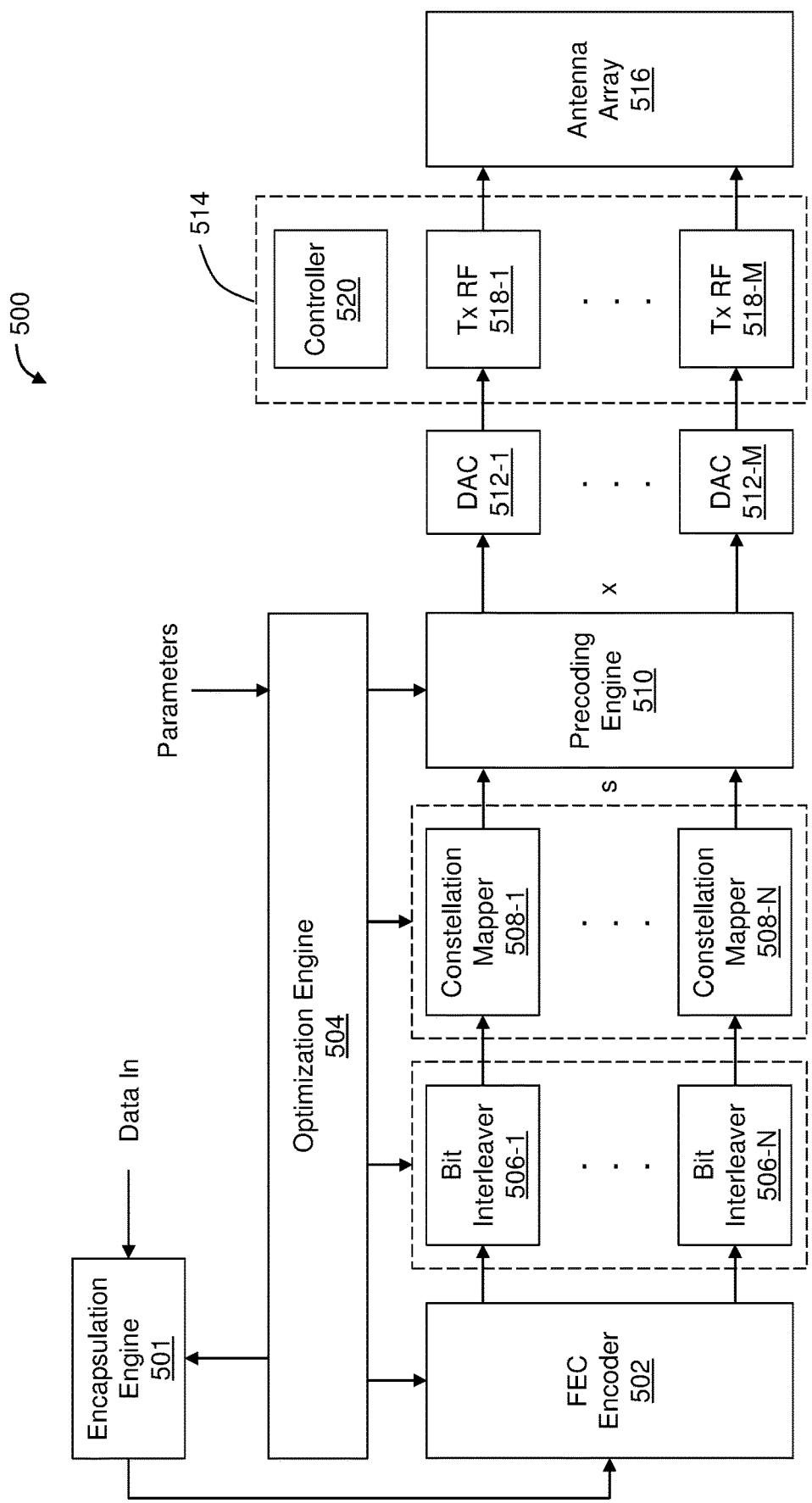
FIG. 5 illustrates an example station suitable for use as a transmitter.

FIG. 5 illustrates an example station 500 suitable for use as a transmitter. The station 500 may include, may be included in, or may correspond to the system 200 of FIG. 2. The station 500 includes an encapsulation engine 501, a FEC encoder 502, an optimization engine 504, bit interleavers 506-1 to 506-N (referred to collectively as bit interleavers 506), constellation mappers 508-1 to 508-N (referred to collectively as constellation mappers 508), a precoding engine 510, DACs 512-1 to 512-M (referred to collectively as DAC 512), an RF module 514, and antenna array 516.

In the example of FIG. 5, data is provided to the encapsulation engine 501. The encapsulation engine is part of a DLL. As such, packet-level aggregation and fragmentation operating parameters can be adjusted at the encapsulation level to adjust performance of a wireless network that includes the station 500, e.g., in accordance with rules derived from packet-specific and environment-specific parameters or other first parameters.

Data bits from the encapsulation engine 501 are encoded at the FEC encoder 502. An FEC encoder is provided in this example because it is a typical device to encode bits in applications such as this. This component, and other components of FIG. 5, could be replaced with alternative components that are capable of providing a signal associated with data, bits to the antenna array 516 for transmission onto a MIMO channel with appropriate MCS.

In the example of FIG. 5, the optimization engine 504 obtains first parameters used to generate a metric upon which performance adjustment determinations may be made. The optimization engine 504 may include, may be included in, or may correspond to the optimization engine 202 of FIG. 2. The optimization engine 504 controls the FEC encoder 502 such that coding of the data bits is in accordance with operating parameters. Depending upon the implementation, the optimization engine 504 may also control the bit interleavers 506. This may include incorporating knowledge about the MCS or other operating parameter(s) that is appropriate for the data. Depending upon the implementation, the optimization engine 504 may also control the constellation mappers 508. Depending upon the implementation, the optimization engine 504 may also control the precoding engine 510, and may even provide the precoding matrix Q.

In the example of FIG. 5, the coded bits are demultiplexed into $N_s$ independent spatial streams, which are provided to the bit interleavers 506. The number of bit interleavers will typically correspond to the number of spatial streams, though it is conceivable that a system could have more (perhaps unused) or fewer (though this would be of dubious value using state of the art techniques) bit interleavers.

In the example of FIG. 5, the interleaved bits are mapped to constellation symbols (such as quadrature amplitude modulation) at the constellation mappers 508. A large number of bits in a constellation corresponds to a "high" modulation (or a high MCS). The number of constellation mappers will typically correspond to the number of spatial streams, though it is conceivable that a system could have more (perhaps unused) or fewer constellation mappers. One can use fewer constellation mappers than spatial streams by multiplexing/switching so that one constellation mapper could service multiple streams. This saves space, cost, etc. The constellation symbols are collected to form a $N_s \times 1$ constellation vector s.

In the example of FIG. 5, the constellation vector s is combined with the precoding matrix Q at the precoding engine 510. In this example, the precoding engine 510 generates an $M_t \times 1$ transmitted vector x, where x=Qs. Alternatively, the constellation vector s and the precoding matrix Q could be combined in some other manner.

In the example of FIG. 5, the digital vector x is converted to analog waveforms at the DAC 512. The number of DACs will typically correspond to the number of antennas in the antenna array 516, though it is conceivable that the DAC 512 could include more or fewer DACs.

In the example of FIG. 5, the analog waveforms are upconverted to the desired carrier frequency at the RF module 514. The RF module 514 includes RF chains 518-1 to 518-M (referred to collectively as RF chains 518) and a controller 520. The analog waveforms are provided through the RF chains 518 (the number of RF chains 518 will typically correspond to the number of antennas in the antenna array 516) to the antenna array 516 for transmission. The RF chains 518 may be part of a circuit that includes the controller 520, which is typically capable of tuning to a desired carrier frequency.

Figure 6:
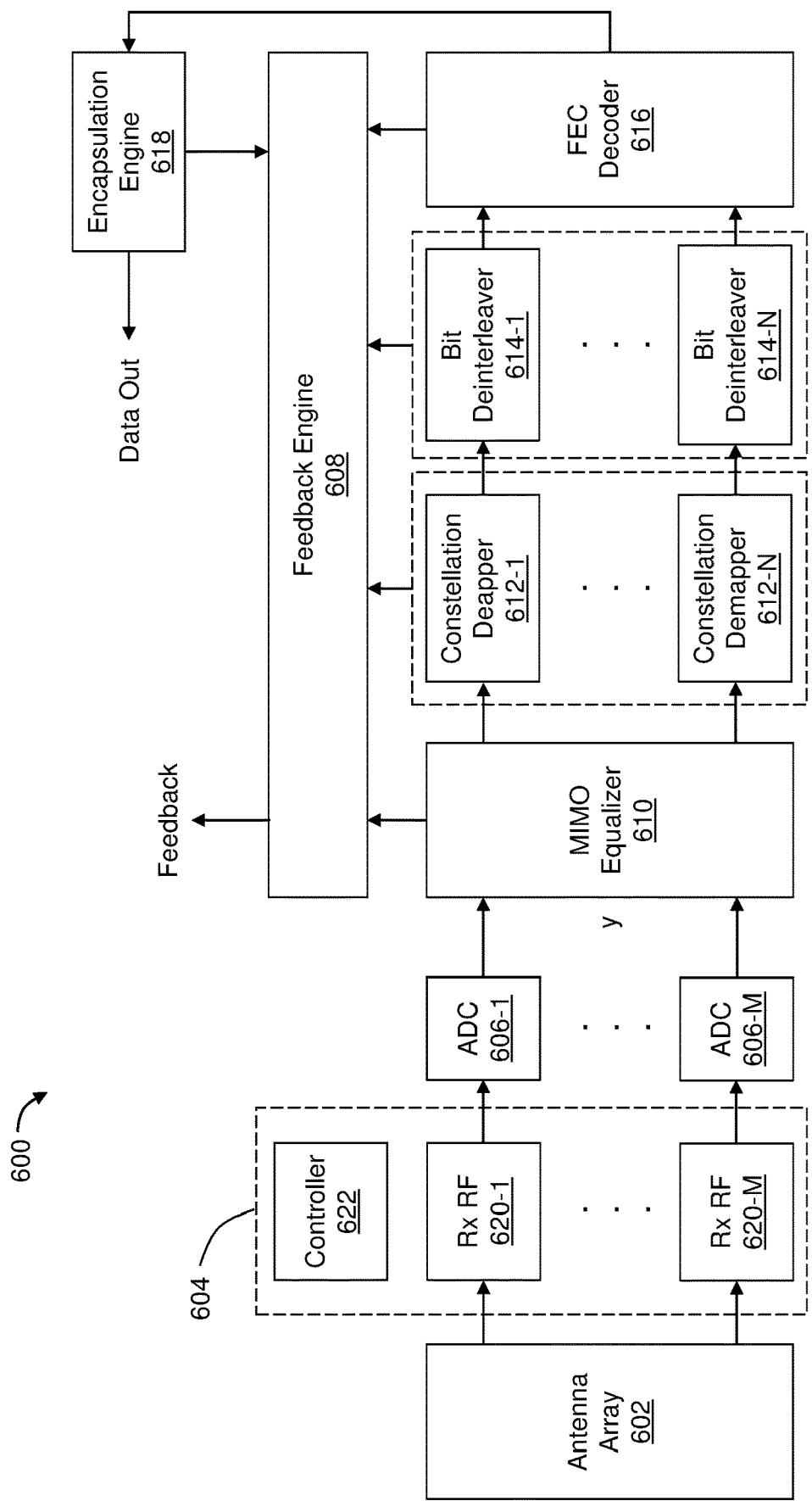
FIG. 6 depicts an example station suitable for use as a receiver.

FIG. 6 depicts an example station 600 suitable for use as a receiver. The station 600 includes an antenna array 602, an RF module 604, analog-to-digital converters (ADCs) 606-1 to 606-M (referred to collectively as the ADC 606), a feedback engine 608, a MIMO equalizer 610, constellation demappers 612-1 to 612-N (referred to collectively as the constellation demappers 612), bit deinterleavers 614-1 to 614-N (referred to collectively as the bit deinterleavers 614), an FEC decoder 616, and an encapsulation engine 618.

The station 600 includes components that may or may not be implemented, but which are provided as an example. For example, signal processing (from the MIMO equalizer 610 to the FEC decoder 616) may be simplified and/or replaced if the station 600 is implemented with receive chains collocated with transmit chains.

In the example of FIG. 6, signals are collected by the antenna array 602, and downconverted to baseband at the RF module 604. The RF module 604 includes RF chains 620-1 to 620-M (referred to collectively as the RF chains 620) and a controller 622. The RF chains 620 may be part of a circuit that includes the controller 622, which is capable of tuning to a desired carrier frequency. In the example of FIG. 6, analog baseband waveforms received from the RF module 604 are digitized at the ADC 606 to produce an $M_r \times 1$ digital received vector y.

In the example of FIG. 6, the feedback engine 608 provides feedback to a transmitter (not shown) that includes either unprocessed data from various components in the station 600, or the feedback engine 608 could process the data and send the processed data as feedback. The feedback may include any data that would be useful in at least determining channel conditions and, more generally, environmental parameters or other first parameters.

In the example of FIG. 6, the MIMO equalizer 610 receives digitized signals from the ADC 606 and applies the matrix Q to form an $N_s \times 1$ equalized vector. In the example of FIG. 6, the equalized vector passes through the constellation demappers 612 and at the bit-deinterleavers 614, the $N_s$ data streams are multiplexed into a single stream, data bits are obtained by the FEC decoder 616, and the data bits are provided to the encapsulation engine 618 for encapsulation into packets.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a MIMO apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention. All changes which come within the meaning and range of equivalency of the claims are to be embraced within their scope.

What is claimed is:

1. A method, comprising:
  obtaining, from different locations, a plurality of parameters associated with a wireless network, wherein the plurality of parameters includes one or more environment-specific parameters and one or more packet-specific parameters;
  correlating or weighting a locally measured parameter with a delay-compensated remotely measured parameter, wherein:
    the locally measured parameter includes an environment-specific parameter of the one or more environment-specific parameters measured locally or a packet-specific parameter of the one or more packet-specific parameters measured locally;
    the delay-compensated remotely measured parameter includes the environment-specific parameter measured remotely with delay between its remote measurement and local receipt being compensated or the packet-specific parameter measured remotely with delay between its remote measurement and local receipt being compensated; and the correlating or weighting the locally measured parameter with the delay-compensated remotely measured parameter comprises determining an amount and direction of a weight adjustment of the locally measured parameter based on a level of agreement or disagreement between the locally measured parameter and the delay-compensated remotely measured parameter;

generating a metric from a combination of the plurality of parameters including the correlated or weighted locally measured parameter;

in response to determining to adjust performance of the wireless network based on the metric, determining one or more operating parameters to adjust; and adjusting the performance of the wireless network by adjusting the one or more operating parameters.

2. The method of claim 1, wherein the adjusting the performance by adjusting the one or more operating parameters comprises at least one of:

adjusting latency;

adjusting packet error rate;

adjusting throughput; or adjusting packets per second (PPS).

3. The method of claim 1, wherein the plurality of parameters further comprises at least one of service constraints of the wireless network or user feedback.

4. The method of claim 3, wherein:

the plurality of parameters further comprises the service constraints; and the service constraints of the wireless network comprise at least one of:

maximum throughput of the wireless network;

best-effort delivery constraints;

streaming video traffic delivery constraints;

streaming audio traffic delivery constraints;

voice traffic delivery constraints;

parental constraints;

a maximum number of streaming video channels permitted by an Internet Service Provider (ISP) communicatively coupled to the wireless network;

maximum download speed permitted by the ISP; or maximum upload speed permitted by the ISP.

5. The method of claim 1, further comprising determining to adjust the performance of the wireless network based on the metric by at least one of:

determining to adjust the performance of the wireless network as a whole;

determining to adjust the performance per traffic type;

determining to adjust the performance per user type; or determining to adjust the performance per application type.

6. The method of claim 1, wherein adjusting the performance of the wireless network by adjusting the one or more operating parameters comprises at least one of:

adjusting a modulation and coding scheme (MCS);

enabling or disabling request to send (RTS)/clear to send (CTS) flow control;

adjusting a modulation rate;

adjusting Nss of a beamforming matrix;

enabling or disabling orthogonal frequency division multiple access (OFDMA);

adjusting a number of downlink (DL) OFDMA resource units (RUs) for an allocation;

adjusting uplink OFDMA (UL OFDMA) assignments;

adjusting aggregation size of at least one of aggregate-media access control (MAC) service data units (A-MSDUs) and aggregate-MAC protocol data units (A-MPDUs);

enabling or disabling multiuser (MU)-multiple input multiple output (MIMO);

adjusting one or more MU-MIMO parameters selected from the following: a duration of packet wait time out for stations in MU-MIMO group to fill traffic for MU-MIMO transmission, MU-MIMO group formation, and MU-MIMO rate;

adjusting a duration of a guard interval; or adjusting retry rates for packet retransmissions.

7. The method of claim 1, further comprising, repeatedly performing the following over time for each packet in the wireless network:

obtaining a current plurality of parameters associated with the wireless network;

generating a current metric from the combination of the current plurality of parameters;

in response to determining to adjust current performance of the wireless network based on the current metric, determining one or more current operating parameters to adjust; and adjusting the current performance by adjusting the one or more current operating parameters.

8. The method of claim 1, wherein generating the metric comprises:

generating a traffic demand-to-channel availability ratio based on the plurality of parameters;

generating an airtime utilization metric based on the plurality of parameters; and combining the traffic demand-to-channel availability ratio and the airtime utilization metric to form the metric.

9. The method of claim 8, wherein determining to adjust the performance of the wireless network based on the metric includes:

comparing the metric to a threshold value; and one of:

in response to the metric moving from above the threshold value to below the threshold value, determining to at least one of: decrease latency, decrease packet error rate, decrease throughput, or decrease packets per second (PPS); or in response to the metric moving from below the threshold value to above the threshold value, determining to at least one of: increase latency, increase packet error rate, increase throughput, or increase PPS.

10. The method of claim 8, further comprising:

determining traffic demand by considering at least one of pending traffic in transmit buffers or pending traffic in uplink (UL) transmission buffers; and determining channel availability based on a radio frequency (RF) environment and clear channel assessment (CCA) registers to see how much airtime is available; wherein:

the traffic demand-to-channel availability ratio is a ratio of the determined traffic demand to the determined channel availability; and combining the traffic demand-to-channel availability ratio and the airtime utilization metric to form the metric comprises summing the traffic demand-to-channel availability ratio and the airtime utilization metric.

11. The method of claim 1, wherein adjusting the performance of the wireless network by adjusting the one or more operating parameters comprises at least one of:
adjusting a modulation rate;
adjusting Nss of a beamforming matrix;
enabling or disabling orthogonal frequency division multiple access (OFDMA);
adjusting a number of downlink (DL) OFDMA resource units (RUs) for an allocation;
adjusting uplink OFDMA (UL OFDMA) assignments;
adjusting aggregation size of at least one of aggregate-media access control (MAC) service data units (A-MSDUs) and aggregate-MAC protocol data units (A-MPDUs);
enabling or disabling multiuser (MU)-multiple input multiple output (MIMO);
adjusting one or more MU-MIMO parameters selected from the following: a duration of packet wait time out for stations in MU-MIMO group to fill traffic for MU-MIMO transmission, MU-MIMO group formation, and MU-MIMO rate; or
adjusting a duration of a guard interval.

12. A system, comprising:
one or more hardware components to process digital data;
a digital-to-analog converter (DAC) coupled to the one or more hardware components to convert the digital data to an analog waveform;
a radio frequency (RF) chain coupled to the DAC to upconvert the analog waveform to a carrier frequency; and
an optimization engine coupled to the one or more hardware components and configured to:
obtain, from different locations, a plurality of parameters associated with a wireless network, the plurality of parameters including one or more packet-specific parameters and one or more environment-specific parameters, and one or more locally and remotely measured parameters;
correlate or weight a locally measured parameter with a delay-compensated remotely measured parameter, wherein:
the locally measured parameter includes an environment-specific parameter of the one or more environment-specific parameters measured locally or a packet-specific parameter of the one or more packet-specific parameters measured locally;
the delay-compensated remotely measured parameter includes the environment-specific parameter measured remotely with delay between its remote measurement and local receipt being compensated or the packet-specific parameter measured remotely with delay between its remote measurement and local receipt being compensated; and
the correlating or weighting the locally measured parameter with the delay-compensated remotely measured parameter comprises determining an amount and direction of a weight adjustment of the locally measured parameter based on a level of agreement or disagreement between the locally measured parameter and the delay-compensated remotely measured parameter;
generate a metric from a combination of the plurality of parameters including the correlated or weighted locally measured parameter;
determine one or more operating parameters of the one or more hardware components to adjust in response to a determination to adjust a performance of the wireless network based on the metric; and
adjust the performance of the wireless network by adjusting the one or more operating parameters.

13. The system of claim 12, wherein the optimization engine is configured to adjust the performance of the wireless network by adjusting the one or more operating parameters by at least one of:
adjusting latency;
adjusting packet error rate;
adjusting throughput; or
adjusting packets per second (PPS).

14. The system of claim 12, wherein the plurality of parameters further comprises at least one of service constraints of the wireless network or user feedback.

15. The system of claim 14, wherein:
the plurality of parameters further comprises the service constraints; and
the service constraints of the wireless network comprise at least one of:
maximum throughput of the wireless network;
best-effort delivery constraints;
streaming video traffic delivery constraints;
streaming audio traffic delivery constraints;
voice traffic delivery constraints;
parental constraints;
a maximum number of streaming video channels permitted by an Internet Service Provider (ISP) communicatively coupled to the wireless network;
maximum download speed permitted by the ISP; or
maximum upload speed permitted by the ISP.

16. The system of claim 12, wherein the optimization engine is further configured to adjust the performance of the wireless network based on the metric by at least one of:
determining to adjust the performance of the wireless network as a whole;
determining to adjust the performance per traffic type;
determining to adjust the performance per user type; or
determining to adjust the performance per application type.

17. The system of claim 12, wherein the optimization engine is configured to adjust the performance of the wireless network by adjusting the one or more operating parameters by at least one of:
adjusting a modulation and coding scheme (MCS);
enabling or disabling request to send (RTS)/clear to send (CTS) flow control;
adjusting a modulation rate;
adjusting Nss of a beamforming matrix;
enabling or disabling orthogonal frequency division multiple access (OFDMA);
adjusting a number of downlink (DL) OFDMA resource units (RUs) for an allocation;
adjusting uplink OFDMA (UL OFDMA) assignments;
adjusting aggregation size of at least one of aggregate-media access control (MAC) service data units (A-MSDUs) and aggregate-MAC protocol data units (A-MPDUs);
enabling or disabling multiuser (MU)-multiple input multiple output (MIMO);
adjusting one or more MU-MIMO parameters selected from the following: a duration of packet wait time out for stations in MU-MIMO group to fill traffic for MU-MIMO transmission, MU-MIMO group formation, and MU-MIMO rate;
adjusting a duration of a guard interval; or
adjusting retry rates for packet retransmissions.

18. The system of claim 12, wherein the optimization engine is further configured to repeatedly perform the following over time for each packet in the wireless network:
obtaining a current plurality of parameters associated with the wireless network;
generating a current metric from the combination of the current plurality of parameters;
in response to determining to adjust current performance of the wireless network based on the current metric, determining one or more current operating parameters to adjust; and
adjusting the current performance by adjusting the one or more current operating parameters.

19. The system of claim 12, wherein the optimization engine is configured to generate the metric by:
generating a traffic demand-to-channel availability ratio based on the plurality of parameters;
generating an airtime utilization metric based on the plurality of parameters; and
combining the traffic demand-to-channel availability ratio and the airtime utilization metric to form the metric.

20. The system of claim 19, wherein the optimization engine is configured to determine to adjust the performance of the wireless network based on the metric by:
comparing the metric to a threshold value; and
one of:
in response to the metric moving from above the threshold value to below the threshold value, determining to at least one of: decrease latency, decrease packet error rate, decrease throughput, or decrease packets per second (PPS); or
in response to the metric moving from below the threshold value to above the threshold value, determining to at least one of: increase latency, increase packet error rate, increase throughput, or increase PPS.

\* \* \* \* \*